United States Patent [19]

van der Meer et al.

[11] Patent Number: 4,730,145
[45] Date of Patent: Mar. 8, 1988

[54] DEFLECTION UNIT HAVING A THIN-WALLED YOKE RING FOR CATHODE-RAY TUBES

[75] Inventors: Aant B. D. van der Meer; Theodorus G. W. Stijntjes, both of Eindhoven, Netherlands

[73] Assignee: U.S. Philips Corporation, New York, N.Y.

[21] Appl. No.: 890,765

[22] Filed: Jul. 25, 1986

[30] Foreign Application Priority Data

Jul. 30, 1985 [NL] Netherlands .......................... 8502155
Feb. 27, 1986 [NL] Netherlands .......................... 8600489

[51] Int. Cl.$^4$ .......................... H01J 29/70; H01F 3/00
[52] U.S. Cl. .................................... 313/440; 335/210; 335/297
[58] Field of Search .................. 313/440; 358/248; 335/210, 212, 213, 297, 299; 445/23, 36

[56] References Cited

U.S. PATENT DOCUMENTS 3,512,233 5/1970 Mancini .............................. 445/36
4,431,979 2/1984 Stijntjes et al. ..................... 335/210

Primary Examiner—David K. Moore
Assistant Examiner—Sandra L. O'Shea
Attorney, Agent, or Firm—Thomas A. Briody; Jack Oisher; William J. Streeter

[57] ABSTRACT

A deflection unit (6) for a cathode-ray tube having a yoke ring (9) of a sintered, oxidic, ferromagnetic material. The yoke ring has a reduced wall thickness with respect to the wall thickness of conventional yoke rings, such reduced thickness being less than 6 mm and preferably in the range from 2 to 4 mm, and yet the ring is of sufficient mechanical rigidity because it is essentially stress-free. That may be achieved by sintering and cooling the yoke ring so that the oxygen content near the surface differs very little from that in the interior thereof, or so that a substantial difference in oxygen content is only present in a very thin surface layer thereof.

16 Claims, 7 Drawing Figures

DEFLECTION UNIT HAVING A THIN-WALLED YOKE RING FOR CATHODE-RAY TUBES

BACKGROUND OF THE INVENTION

1. Field of the Invention

The invention relates to a deflection unit for a cathode-ray tube, comprising a first and a second system of deflection coils and an annular core of a sintered, oxidic, ferromagnetic material. The cathode-ray tube for which the deflection unit is destined may be, for example, a display tube (for example, a data graphic display tube, a colour display tube or a projection television display tube), an oscilloscope tube or a camera tube.

2. Description of the Related Art

A deflection unit for camera tubes usually has a cylindrical core, whereas deflection units for display tubes generally have an annular core which is cup-shaped or funnel-shaped. For mechanical rigidity, annular cores of sintered oxidic ferromagnetic material for display tubes, hereinafter also termed yoke rings, are generally given a wall thickness which is larger than is necessary for the actual function as a core material for deflection coils. For example, a given type of ferrite yoke ring for black-white display tubes has a mass approximately 360 g, height approximately 55 mm, upper and lower diameters approximately 55 and approximately 85 mm, respectively (measured internally), and a wall thickness of 6 mm, a value which with a view to the said properties is unnecessarily high. 6 mm is a frequently occurring wall thickness in ferrite yoke rings. Such deflection units are secured to the necks of display tubes by means of a clamping band, as a result of which the neck of the tube supports the whole weight of the deflection unit. Therefore, too high a weight is disadvantageous since fracture of the neck of the tube is possible. The existing practice of overdimensioning ferrite yoke rings as regards their wall thicknesses is based on the assumption that in this manner mechanical rigidity is achieved which is necessary for handling during manufacture as well as during the mounting in the deflection unit. This assumption in turn is associated with the lack of insight as regards the factors determining the mechanical rigidity of a ferrite yoke ring. An essential problem hence is: how do we obtain a yoke ring of a sintered, oxidic ferromagnetic material having a reduced wall thickness while maintaining its mechanical rigidity. The availability of a yoke ring having a reduced thickness is also of importance for deflection units of camera tubes. In practice, only yoke rings in the form of non-metal sleeves or rolls have so far been used in such deflection units, because a yoke ring of ferrite was said to occupy too much space.

SUMMARY OF THE INVENTION

The invention provides a solution to the above problem. According to the invention a deflection unit of the type mentioned in the opening paragraph is characterized in that the annular core is thin-walled and the oxygen content of the sintered oxidic, ferromagnetic material of the annular core at or adjacent its surface is substantially the same as the oxygen content of the ferromagnetic material within the annular core so that the annular core is substantially stress-free.

The invention is based on the recognition of the fact that, although mechanical rigidity is indeed associated with the wall thickness, it is in practice often the mechanical stresses which are introduced during the sintering process which play a decisive role. The recognition that ferrite yoke rings during sintering are subjected to an oxygen reduction process is significant for the invention.

Measurements of the partial oxygen pressure as a function of the ferrite material which is often used in yoke rings have as a matter of fact demonstrated that the equilibrium pressure at temperatures above 1150° C. already exceeds the value of 0.021 MPa (air). This means that during the sintering process which often takes place in air (or in an atmosphere with even less oxygen) at a temperature which is usually considerably higher than the said 1150° C., the ferrite material loses oxygen, a loss which the material during cooling tries to compensate for by means of an intake of oxygen from the surrounding atmosphere. This oxygen penetration takes place via the surface of the sintered product with decrease in temperature, i.e. as a result of a diffusion process which occurs more and more slowly as the temperature drops. Consequently, a surface layer is formed which is richer in oxygen than the more inwardly situated material. Measurements have also demonstrated that such an oxygen intake is associated with a variation in length, either expansion or contraction, depending on the ferrite used. As a result of this the formation of a surface layer can be imagined which is under a compressive stress or a tensile stress with respect to the remaining material. These local stresses often give rise to cracks in the sintered product. When these stresses are avoided, which results in a considerably higher breakage strength of the yoke ring, it also becomes possible to realise a product of a sufficiently high mechanical rigidity but with a considerably thinner wall thickness and a considerably lower weight.

Within the scope of the invention wall thicknesses can be realised, depending on the length and the maximum outside diameter of the ferrite yoke ring, of less than 6 mm and in particular of 4 mm and under. The invention has successfully resulted in ferrite yoke rings having a wall thickness of 3 mm, and even a wall thickness of 2 mm.

By using thin-walled yoke ring constructions a great saving in weight is achieved which in a first instance can result in a saving of material, and hence in a price reduction, while in a second instance the material choice for yoke rings may be widened to allow the use of higher (more expensive) qualities. It is then possible, for example, to use a material which gives rise to low (power) losses. When using present-day electric circuits it is important that the losses be kept as low as possible. In addition to saving of weight, the savings of space which can be achieved by means of thin-walled yoke rings is of importance, in particular in the case of yoke rings for camera tubes.

A further advantage of the thin-walled yoke ring consists of two halves these can be secured together by means of an adhesive (in particular a layer of adhesive of at most 10 μm). As the wall of the inventive yoke ring is so thin and the weight of the yoke ring halves thus is relatively low, the bounding by a layer of adhesive is satisfactory. In practice one obtains a good adhesion between the two halves by using a contact adhesive as adhesive to secure the two halves. In conventional thick-walled yoke rings springs are used, to secure the two halves.

The control of the oxygen content which forms the basis of the present invention can be carried out in various manners. It has been described hereinbefore that the oxygen content at or adjacent the surface must differ minimally from the oxygen content within the yoke ring. A small but material difference can be allowed if measures are taken so that the thickness of a layer at the surface having an oxygen content differing from the oxygen content of the interior of the yoke ring is too low to build up a mechanical stress which exceeds the breakage limit of the material. This situation can be reached by giving the yoke ring a sufficiently high density, in the case of MnZn-ferrite for example a density of at least 4.75 gcm$^{-3}$.

BRIEF DESCRIPTION OF THE DRAWINGS

A few embodiments of the invention, which also relate to an annular core for use with a deflection unit, will now be described in greater detail with reference to the drawings in which.

DESCRIPTION OF THE PREFERRED EMBODIMENTS

Figure 1:
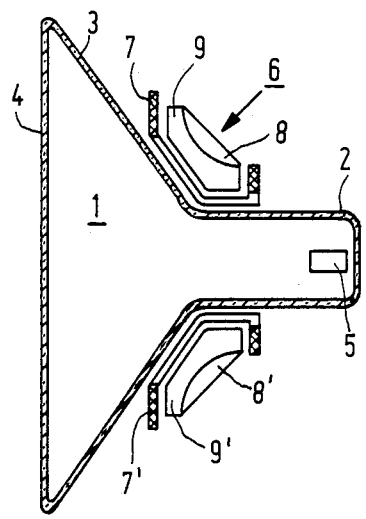
FIG. 1 shows diagrammatically a television display tube having a deflection unit.

FIG. 1 is a diagrammatic longitudinal sectional view of a display tube 1 for monochrome or colour television. It consists of a cylindrical neck portion 2 and an adjoining flared portion 3 which is closed at the front (on the left on FIG. 1) by a display screen 4. Present in the neck portion 2 is shown diagrammatically an electrode system 5 with which one electron beam (in the case of a monochrome display tube) or three electron beams extending in one plane (in the case of colour television) can be generated. At the area where the neck portion 2 changes into the flared portion 3 a system of deflection coils 6 surrounding the tube 1 coaxially is provided on the tube 1 and consists of a first pair of (saddle-shaped) deflection coils 7, 7' for deflecting the electron beams in the horizontal direction, a second pair of (torroidal) deflection coils 8, 8' for deflecting the electron beams in the vertical direction and a yoke ring 9 supporting the pair of coils 8, 8'. As shown in FIG. 1, the shape of the deflection coils 7, 7' and of the yoke ring 9 is adapted to the flared portion of the display tube 1. The horizontal deflection coils 7, 7' are situated on either side of a horizontal deflection plane, which is the plane in which the three electron beams extend in the case of a colour TV tube. The vertical deflection coils 8, 8' are also situated on either side of said horizontal deflection plane. The vertical deflection plane is at right angles to said plane and hence coincides with the plane of the drawing.

The yoke ring 9 is manufactured from sintered, oxydic ferromagnetic material. If has a flared shape so that it fits the deflection coil pair 7, 7' with a small amount of play.

Figure 2A:
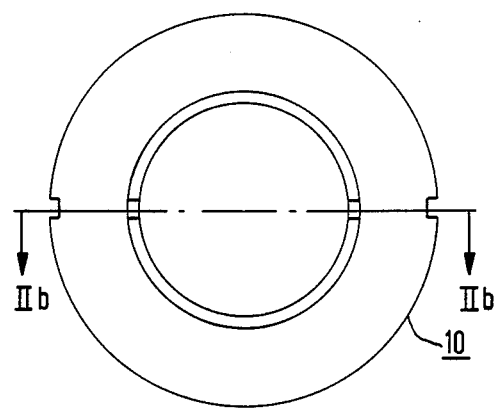
FIGS. 2a and 2b are a rear view and a longitudinal sectional view, respectively, through a yoke ring for a 90° hybrid deflection unit.
Figure 2B:

FIG. 2a is a rear view and FIG. 2b a longitudinal sectional view through a yoke ring for a deflection unit according to the invention. In the present case it relates to a yoke ring 10 which consists of two halves and has its largest outside diameter (on the cup side) of 86 mm and its smallest diameter (on the neck side) of 54 mm. The wall thickness of the yoke ring is 3 mm. The (90°) deflection unit for which it is destined is of the hybrid type, i.e. a toroidal field coil is wound on each yoke ring half. After the coil has been wound on each yoke ring half, the halves are secured together by means of a contact adhesive, for example cyanoacrylate.

Figures 3A, 4A:
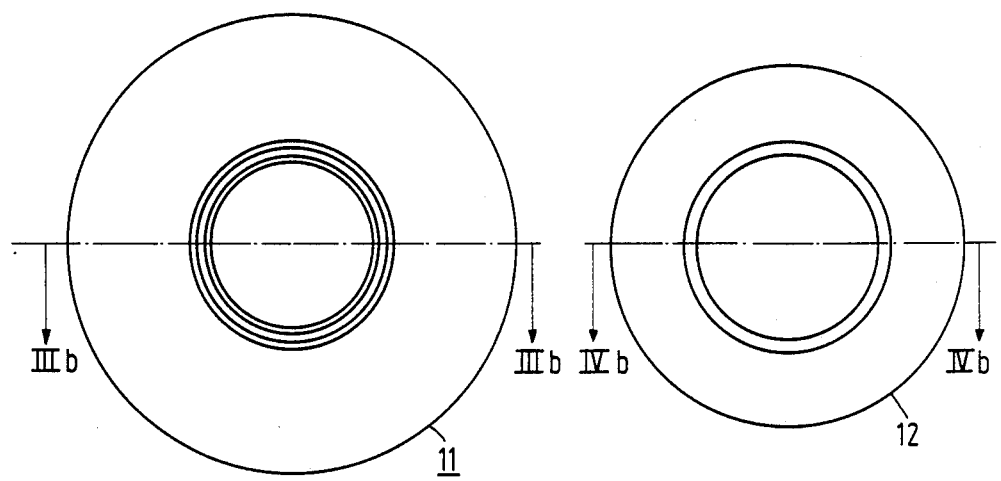
FIGS. 3a and 3b are a rear view and a longitudinal sectional view, respectively, through a yoke ring for a 110° (wide angle) deflection unit.
FIGS. 4a and 4b are a rear view and a longitudinal sectional view, respectively, through a yoke ring for a monochromatic data graphic display deflection unit.
Figures 3B, 4B:
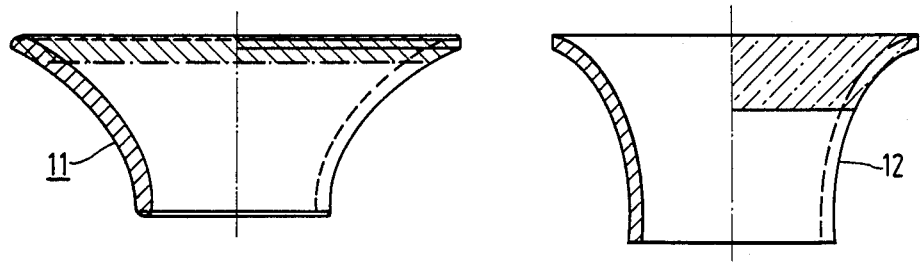

FIG. 3a is a rear view and FIG. 3b a longitudinal sectional view through a yoke ring for a second deflection unit according to the invention. In the present case it relates to yoke ring 11 which is formed in one piece and has a largest outside diameter of 113 mm and a smallest outside diameter of 57.5 mm. The wall thickness of the yoke ring 11 is 4 mm. The (110°7) colour deflection unit for which it is destined is of the double-saddle type, i.e. both the line and the field deflection coil systems are of the saddle and are together surrounded by the yoke ring.

FIG. 4a is a rear view and FIG. 4b a longitudinal sectioned view through a yoke ring for a third deflection unit according to the invention. In the present case it relates to a yoke ring 12 which is formed in one piece and has an outside diameter of 54 mm at its widest end. The wall thickness of the yoke ring 12 is 3 mm; the thickness of a conventional yoke ring would be 6 mm. Due to its comparatively long cylindrical neck portion this is a product which is complicated to manufacture. The deflection unit for which the yoke ring 12, is destined, is a monochrome data graphic display unit.

The occurrence of mechanical stresses during the sintering/cooling process of the yoke ring can be avoided in various manners of which the two most practical ones are:

a. The use of such a low sintering temperature that upon sintering, for example in air, the difference between the applied oxygen pressure and an equilibrium pressure of the ferrite preferably is not larger than approximately 0.06 MPa. As a result of this the reducing effect of the furnace atmosphere is sufficiently low; so that the material only loses little oxygen, and consequently there is a lower tendency for oxygen to penetrate during cooling. This approach is preferably chosen if a reduction of the magnetic properties of the material is undesired.

b. Realisation of a comparatively high density during the sintering process. As a result of this the oxygen penetration during cooling is impeded in such a manner that it is restricted to an extremely thin surface layer the thickness of which is too small to build up a mechanical stress which exceeds the breakage limit of the material, namely approximately 140 MPa. This solution is preferably chosen if a certain extent of reduction is favourable for the magnetic properties of the yoke ring material.

Two embodiments will now be described.

(i) A yoke ring of magnesium zinc ferrite is manufactured by mixing the raw materials magnesium oxide, zinc oxide, and iron oxide in the desired ratio and prefiring at a temperature of approximately 1150° C. After a grinding step a spray-drying step is carried out, resulting in a compressible powder. After shaping by means of a dry compression process sintering is carried out in a directly heated gas furnace, the maximum temperature being approximately 1260° C. and the oxygen content of the furnace atmosphere being between 8 and 21%. After cooling, the products are free from mechanical stresses and strong enough to be subjected to a mechanical grinding treatment. The major dimensions of the yoke ring of the selected example are: height approximately 44 mm, inside neck diameter approximately 47 mm, inside cup diameter approximately 87 mm, wall thickness 3 m. The mass of said ring is approximately 120 g; the mass of a comparable conventional ring is approximately 250 g.

(ii) A yoke ring of a manganese zinc ferrite is manufactured by mixing the raw materials manganese oxide, zinc oxide, and iron oxide in the desired ratio and prefiring at a temperature of approximately 180° C. After a grinding step a spray-drying process is carried out resulting in a compressible granulate. The shaping is carried out by means of a dry-compression process. The subsequent sintering process is carried out in a directly heated gas-fired furnace at a temperature of approximately 1350° C. with an oxygen content in the same range as in the preceeding example but slightly lower. This results in a density which is not lower than 4.75 g/cm$^3$. After cooling, the yoke ring is free from mechanical stresses and hence strong enough to be subjected to mechanical grinding treatment. The major dimensions of the ring of the selected example are: height approximately 55 mm, inside diameter neck approximately 45 mm, inside diameter cup approximately 85 mm, wall thickness 2 mm. The weight of the ring is approximately 120 g; the weight of a conventional ring would be approximately 360 g.

Examples of other materials which are suitable for the manufacture of thin-walled yoke rings are LiZn ferrite and NiZn ferrite.

Figure 5:
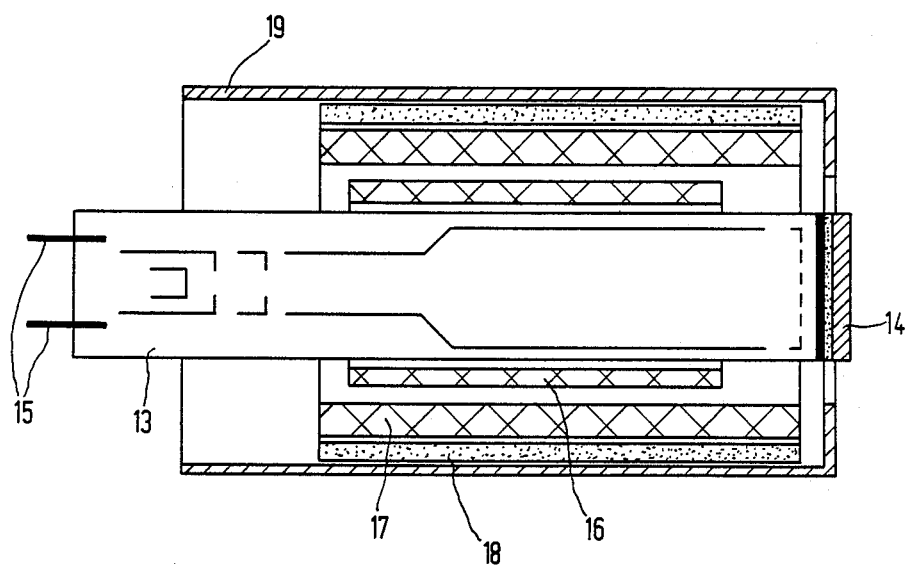

The invention also relates to deflection units for camera tubes. FIG. 5 shows diagrammatically a camera tube 13 which comprises a target 14 and external connection means 15. A deflection unit comprising a deflection coil system 16 is provided around the camera tube 13. A focusing coil 17 is also provided around the camera tube 13. For use in TV cameras having a high number of lines, for example, camera's for High-Definition TV (2000 lines) the system described gives great advantages.

A mu-metal screening cylinder or a mu-metal roll is conventionally provided around the system of coils of a camera tube so that on the one hand the deflection field is intensified and on the other hand a screening is formed against external interference fields (inter alia the earth's magnetic field). The deflection fields are alternating fields so that especially the horizontal deflection fields with their rather high frequency are associated with interference eddy currents in the usual mu-metal screening due to the low resistivity of mu-metal. This is expressed by serious linearity errors and distortion of the deflection field. This is an undesired phenomenon in particular in the case of special camera tubes (so-called dissector tubes) for satellite navigation. For that use the deflection fields must be as linear as possible with the current. The magnetic induction in principle is the same function of the time as the current through the deflection coils. When a cylinder of an electrically conductive material is provided in said field, a resulting induction variation will arise which differs from the primary current form.

These eddy currents can be minimised by using a ferrite ring 18 for the field amplification, as is used also in deflection units for display tubes. If desired, a mu-metal screening 19 can be provided around said ferrite ring 18.

Since only a very restricted place is available for providing the ferrite ring 18, it is of importance for the invention to provide a thin-walled ferrite ring. Where a ferrite ring having a wall thickness of 6 mm cannot be used, a ferrite ring having a wall thickness of, for example, 2 mm can often be used indeed.

What is claimed is:

1. A deflection unit for a cathode-ray tube, comprising a first and a second system of deflection coils and a coil yoke in the form of an annular core of a sintered, oxidic, ferromagnetic material, characterized in that the annular core is less than 6 mm thick and the oxygen content thereof at or adjacent its surface is substantially the same as the oxygen content within the remainder of the annular core; whereby the annular core is substantially stress-free.

2. A deflection unit as claimed in claim 1, characterized in that the annular core has a wall thickness in the range from 2 to 4 mm.

3. A deflection unit as claimed in claim 1, characterized in that the annular core consists of two halves which are bonded together by means of an adhesive.

4. A deflection unit as claimed in claim 3, characterized in that the thickness of the layer of adhesive is at most 10 μm.

5. A deflection unit as claimed in claim 3, characterized in that the adhesive is a contact adhesive.

6. A deflection unit as claimed in claim 2, characterized in that the annular core consists of two halves which are bonded together by means of an adhesive.

7. A deflection unit as claimed in claim 6, characterized in that the thickness of the layer of adhesive is at most 10 μm.

8. A deflection unit as claimed in claim 6, characterized in that the adhesive is a contact adhesive.

9. A deflection unit for a cathode-ray tube, comprising a first and a second system of deflection coils and a coil yoke in the form of an annular core of a sintered, oxidic, ferromagnetic material, characterized in that the annular core is less than 6 mm thick and the oxygen content thereof is substantially the same except in a thin layer adjacent its surface wherein the oxygen content differs substantially from the oxygen content within the remainder of the annular core, such surface layer being sufficiently thin so that the annular core is substantially stress-free.

10. A deflection unit as claimed in claim 9, characterized in that the annular core consists of Mn-Zn ferrite and has a density of at least 4.7 gcm$^{-3}$.

11. A deflection unit as claimed in claim 9, characterized in that the annular core has a wall thickness in the range from 2 to 4 mm.

12. A deflection unit as claimed in claim 9, characterized in that the annular core consists of two halves which are bonded together by means of an adhesive.

13. A deflection unit as claimed in claim 12, characterized in that the thickness of the layer of adhesive is at most 10 μm.

14. A deflection unit as claimed in claim 12, characterized in that the adhesive is a contact adhesive.

15. A deflection unit as claimed in claim 10, characterized in that the annular core has a wall thickness in the range from 2 to 4 mm.

16. A deflection unit as claimed in claim 13, characterized in that the adhesive is a contact adhesive.

* * * * *